(12) United States Patent  
Asati et al.

(10) Patent No.: US 10,924,283 B2  
(45) Date of Patent: Feb. 16, 2021

(54) DYNAMICALLY-CHANGING IDENTITY FOR IOT DEVICES WITH BLOCKCHAIN VALIDATION

(71) Applicant: Cisco Technology, Inc., San Jose, CA (US)

(72) Inventors: Rajiv Asati, Morrisville, NC (US); Nagendra Kumar Nainar, Morrisville, NC (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 15/620,015

(22) Filed: Jun. 12, 2017

(65) Prior Publication Data

US 2018/0359095 A1   Dec. 13, 2018

(51) Int. Cl.
*G06F 21/00* (2013.01)
*H04L 9/32* (2006.01)
(Continued)

(52) U.S. Cl.
CPC ........ *H04L 9/3239* (2013.01); *G06F 16/2228* (2019.01); *H04L 12/281* (2013.01);
(Continued)

(58) Field of Classification Search
CPC ... H04L 9/3239; H04L 63/123; H04L 12/281; H04L 12/2809; H04L 63/0823; G06F 16/2228; G06F 16/2255
See application file for complete search history.

(56) References Cited

U.S. PATENT DOCUMENTS

2016/0275461 A1    9/2016  Sprague et al.
2016/0328713 A1   11/2016  Ebrahimi
(Continued)

FOREIGN PATENT DOCUMENTS

CN    104883405 A     9/2015
EP      3506549 A2 *  7/2019   ........... H04L 9/3239

OTHER PUBLICATIONS

Wattana Viriyasitavat; Li Da Xu; Zhuming Bi; Danupol Hoonsopon; "Blockchain Technology for Applications in Internet of Things—Mapping From System Design Perspective"; IEEE Internet of Things Journal; Year: Oct. 2019 | vol. 6, Issue: 5 | Journal Article | Publisher: IEEE; pp. 8155-8168 (Year: 2019).*
(Continued)

*Primary Examiner* — Shewaye Gelagay
*Assistant Examiner* — Courtney D Fields
(74) *Attorney, Agent, or Firm* — Behmke Innovation Group; James M. Behmke; James J. Wong (57) ABSTRACT

Techniques for use in generating a dynamically-changing IoT device identity with robust blockchain validation are provided. When entering a communication network, an IoT device performs a procedure for registration. The procedure includes communicating, in a transaction, data associated with the IoT device to a network device (e.g. a fog router). The data includes, amongst other data items, an identity for addressing communications to and from the IoT device. A transaction number associated with the transaction is received based on a blockchain registration of the transaction. An updated identity of the IoT device is then derived based on the transaction number. In one example, the updated identity of the IoT device may be derived by combining a static address of the IoT device and the transaction number. The steps may be repeated by the device for each one of a plurality of network registrations.

15 Claims, 7 Drawing Sheets

(51) Int. Cl.
  *H04L 9/00* (2006.01)
  *H04L 12/28* (2006.01)
  *H04L 29/06* (2006.01)
  *G06F 16/22* (2019.01)

(52) U.S. Cl.
  CPC ........ *H04L 12/2809* (2013.01); *H04L 63/123* (2013.01); *G06F 16/2255* (2019.01); *H04L 63/0823* (2013.01); *H04L 2209/38* (2013.01); *H04L 2209/805* (2013.01)

(56) References Cited

U.S. PATENT DOCUMENTS

| | | |
|---|---|---|
| 2016/0330027 A1 | 11/2016 | Ebrahimi |
| 2016/0358158 A1 | 12/2016 | Radocchia et al. |
| 2016/0366123 A1 | 12/2016 | Smith et al. |
| 2017/0011460 A1 | 1/2017 | Molinari et al. |
| 2017/0324738 A1* | 11/2017 | Hari .................... H04L 61/2061 |
| 2018/0189449 A1* | 7/2018 | Karumba ............... G16H 40/67 |

OTHER PUBLICATIONS

Gaharana et al., "A New Approach for Remote User Authentication in a Multi-Server Environment Based on Dynamic-ID using Smart-Card", I. J. Computer Network and Information Security, 2016, 10, 45-52.
Hardjono et al., "Anonymous Identities for Permissioned Blockchains" (Draft v05—Jan. 20, 2016), pp. 1-20.
Cresitello-Dittmar, "Application of the Blockchain for Authentication and Verification of Identity", Nov. 30, 2016, 9 pages.

\* cited by examiner

DYNAMICALLY-CHANGING IDENTITY FOR IOT DEVICES WITH BLOCKCHAIN VALIDATION

TECHNICAL FIELD

The present disclosure relates to addressing of devices in a network, and more particularly to blockchain validation of dynamic addressing of devices.

BACKGROUND

Low-Power and Lossy Networks (LLNs), e.g., sensor networks, have a myriad of applications. An LLN may be an Internet of Things (IoT) network in which "things," e.g., uniquely identifiable objects such as sensors and actuators, are interconnected over a computer network.

In IoT and similar networks, mobile nodes may register with different local networks as they move. For example, a person may carry a number of wearable sensors (e.g., heart rate monitor, blood glucose meter, etc.) that connect to different networks as the user travels (e.g., through a community, between different floors of a building, etc.). Conventionally, each of these sensors and the various networks may have their own registration and authentication mechanisms that can consume multiple resource cycles, depending on how fast the objects are moving.

There is an ongoing need for advancing and improving devices, networks, and communications in the above-described environment, as well as advancing and improving devices, networks, and communications associated with other similar or even unrelated environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in generating a dynamically-changing IoT device identity with robust blockchain validation are described herein.

In one illustrative example, a device (e.g. an IoT device) performs a procedure for registration when entering a communication network. The procedure includes communicating, in a transaction, data associated with the device to a network device (e.g. a router or fog router). The data includes, amongst other data items, an identity for addressing communications to and from the device. A transaction number associated with the transaction is received based on a blockchain registration of the transaction. An updated identity of the device is then derived based on the transaction number. In some implementations, the updated identity of the device may be derived by combining a static address of the device and the transaction number. The steps may be repeated by the device for each one of a plurality of network registrations.

In another illustrative example, data associated with a device (e.g. an IoT device) are received at a network device (e.g. a router or fog router) in a transaction for registering the device in a communication network. The data include an identity for addressing communications to and from the device. At least some of the data are validated against a blockchain. In response to a successful validation of data, the transaction which includes the identity of the device is registered in the blockchain. An updated identity of the device is then received for communications, where the updated identity is derived based on a transaction number associated with the transaction.

Example Embodiments

Figure 1:
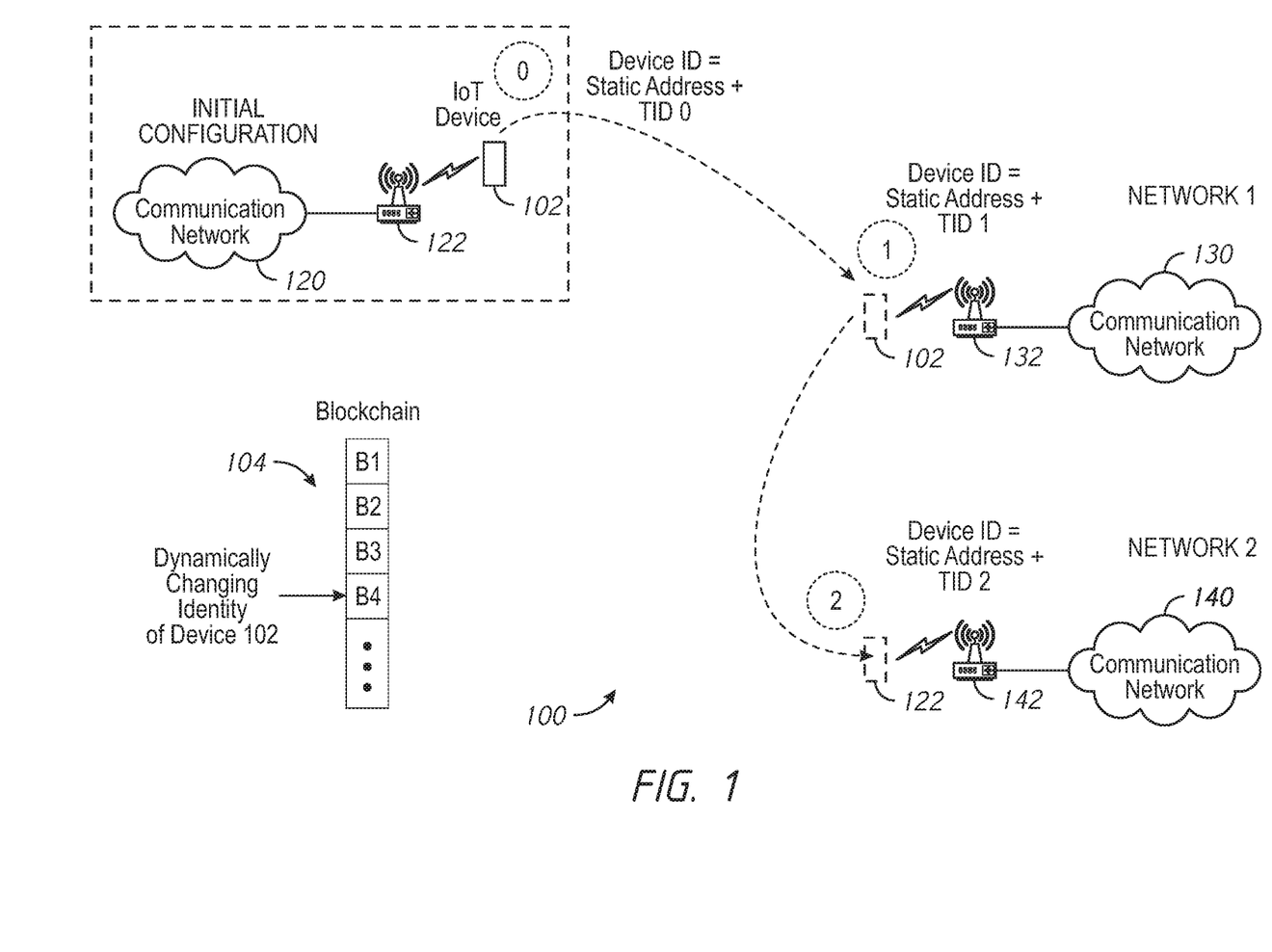
FIG. 1 is an illustration of a plurality of communication networks in which a device, such as an Internet of Things (IoT) device, may communicate with use of a dynamically-changing identity which may be validated against a blockchain.

FIG. 1 is an illustrative diagram 100 of a plurality of communication networks 120, 130, and 140 within which a device 102, such as an Internet of Things (IoT) device, may communicate. Device 102, which may be or include a sensor or sensor device, operates with use of a dynamically-changing identity for communications. In general, the dynamically-changing identity of device 102 may be tracked and validated with use of a blockchain 104.

The communication networks 120, 130, and 140 of FIG. 1 may be or include wireless networks, and include wireless access points, routers, and/or related devices. In FIG. 1, communication networks 120, 130, and 140 include network devices such as wireless fog routers 122, 132, and 142, respectively, for communications with IoT devices. In some implementations, devices in communication network 120, 130, and 140 operate according to IEEE 802.15 for wireless personal area networks (WPANs) or the like.

Communication network 120 (for "INITIAL CONFIGURATION") is adapted for the initial configuration of devices, such as device 102. Communication network 120 may be associated with a factory, a manufacturing facility, a programming center, or the like. Additional communication networks shown in FIG. 1 include communication network 130 labeled as "NETWORK 1" and communication network 140 represented as "NETWORK 2". Devices, such as device 102, may communicate in communication networks 130 and 140 after being initially configured in communication network 120. Note that additional communication networks (not shown in FIG. 1) may be provided for communications with device 102 as well.

In communication network 120, where device 102 is located at a location "0", device 102 may be initially configured with an identity for communications. However, since the identity of device 102 is a dynamically-changing identity, the identity will be updated or changed from network to network. Thus, the initially-configured identity of device 102 from communication network 120 will change when device 102 registers into a new communication network, such as communication network 130 or 140.

For example, the identity of device 102 may be updated or changed when device 102 is relocated to communication network 130 ("NETWORK 1") (where device 102 is relocated to a location "1"). As another example, the identity of device 102 may be further updated or changed when device 102 is relocated to communication network 140 ("NETWORK 2") (where device 102 is relocated to a location "2"). Note that the updating/changing of the identity of device 102 will continue for additional networks and/or registrations in the same and different communication networks.

In FIG. 1, the identity of device 102 which changes from network to network is represented as "Device ID." As illustrated, the Device ID of device 102 may be derived from or include a static address (e.g. a MAC address, or similar type of hardware address or network address). In addition, the Device ID of device 102 may be derived from or include a transaction number or ID (e.g. TID) associated with a transaction, described later in detail below in relation to FIGS. 2 through 6.

In some implementations, the Device ID of device 102 is derived from and/or includes both a static address and a dynamically-changing transaction number or ID (e.g. TID). For example, the Device ID may be a combination or appendage of the static address and a dynamically-changing transaction number. Note that the dynamically-changing identity of device 102, and/or the transaction number associated therewith, may be stored in a memory such as a Non-Volatile Random Access Memory (NVRAM) or the like.

More specifically in FIG. 1, the Device ID of device 102 generated in relation to communication network 120 ("INITIAL CONFIGURATION") may be Device ID="Static Address+TID 0"; the Device ID of device 102 generated in relation to communication network 130 ("NETWORK 1") may be Device ID="Static Address+TID 1"; and the Device ID of device 102 generated in relation to communication network 140 ("NETWORK 2") may be Device ID="Static Address+TID 2".

Figure 2:
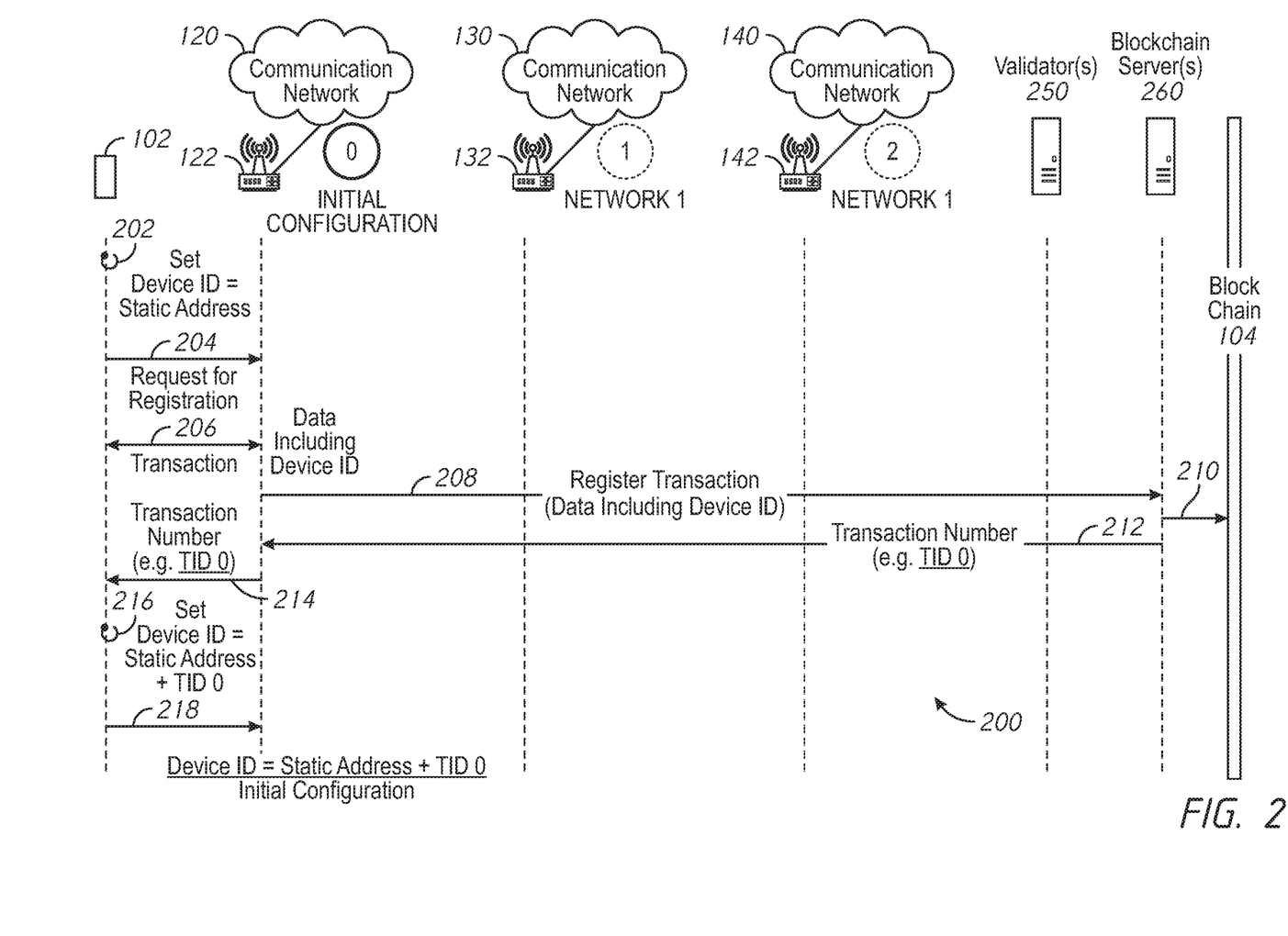
FIG. 2 is a message flow diagram for describing a method of initially configuring a device with an identity for communications.

FIG. 2 is a message flow diagram 200 for describing a method of initially configuring a device 102 with an identity for communications. The device may be an Internet of Things (IoT) device, and/or be or include a sensor. The initial configuration of device 102 may be performed in relation to communication network 120 ("INITIAL CONFIGURATION") at the location "0."

Note that device 102 may initially be set or programmed with a static or fixed address. The static address may be a MAC address, or other similar type of hardware address or network address. The static address may be an address that uniquely identifies the device 102. Device 102 may be configured or set with an identity which is derived from or includes the static address (step 202 of FIG. 2). For example, Device ID=Static Address.

During its initial configuration, device 102 is positioned within a coverage area of communication network 120. In particular, device 102 is positioned at location "0" within a coverage area of fog router 122 of communication network 120 to be configured, programmed, or provisioned.

In response, device 102 initiates a procedure for registering in communication network 204 (step 204 of FIG. 2). In a transaction of the procedure for registration, device 102 may communicate data associated with the device to fog router 122 (step 206 of FIG. 6). The data may include the identity for addressing communications to and from device 102 (e.g. Device ID=Static Address). The data associated with device 102 may be or include other data, such as a device type and/or a device location or geolocation, as some examples.

In step 206, fog router 122 of communication network 120 participates in the transaction with device 102 and receives the data associated with the device. In response, fog router 122 causes the transaction between device 102 and fog router 122 to be registered in the blockchain 104 (step 208 of FIG. 2). The registered transaction may include at least some of the received data, such as the identity of device 102 (e.g. Device ID=Static Address). Note that fog router 122 may be deemed a trusted device at a factory, a manufacturing facility, a programming center, or the like. In some implementations, fog router 122 generates and digitally signs the transaction with its private key and registers the signed transaction in the blockchain 104. Registration of the transaction into blockchain 104 may be performed through use of one or more blockchain servers 260 (step 210 of FIG. 2).

In response to the registration of the transaction in blockchain 104, fog router 122 may receive a transaction number (e.g. "transaction ID 0" or "TID 0") associated with the transaction (step 212 of FIG. 2). Fog router 122 may send the transaction number (e.g. TID 0) to device 102 (step 214 of FIG. 2). Here, fog router 122 may send the transaction number in association with a request to update the identity of device 102. Device 102 may receive the transaction number (e.g. TID 0) associated with the transaction.

In response, device 102 may set or derive an updated identity based on the received transaction number (e.g. TID 0) associated with the transaction (step 216 of FIG. 2). In some implementations, device 102 may derive the updated identity from a static address of the device and the transaction number. In addition, or alternatively, device 102 may derive the updated identity by combining a static address of device 102 and the transaction number. In FIG. 2, the updated identity is represented as Device ID="Static Address+TID 0".

Device 102 may communicate or otherwise provide the updated identity for further communications in communication network 120 if needed (step 218 of FIG. 2). In some implementations, device 102 may communicate the updated identity to fog router 122 and/or communication network 120 for communicating with device 102. During communications in the network, device 102 may receive messages addressed to the updated identity, and send messages addressed from the updated identity.

Figure 3:
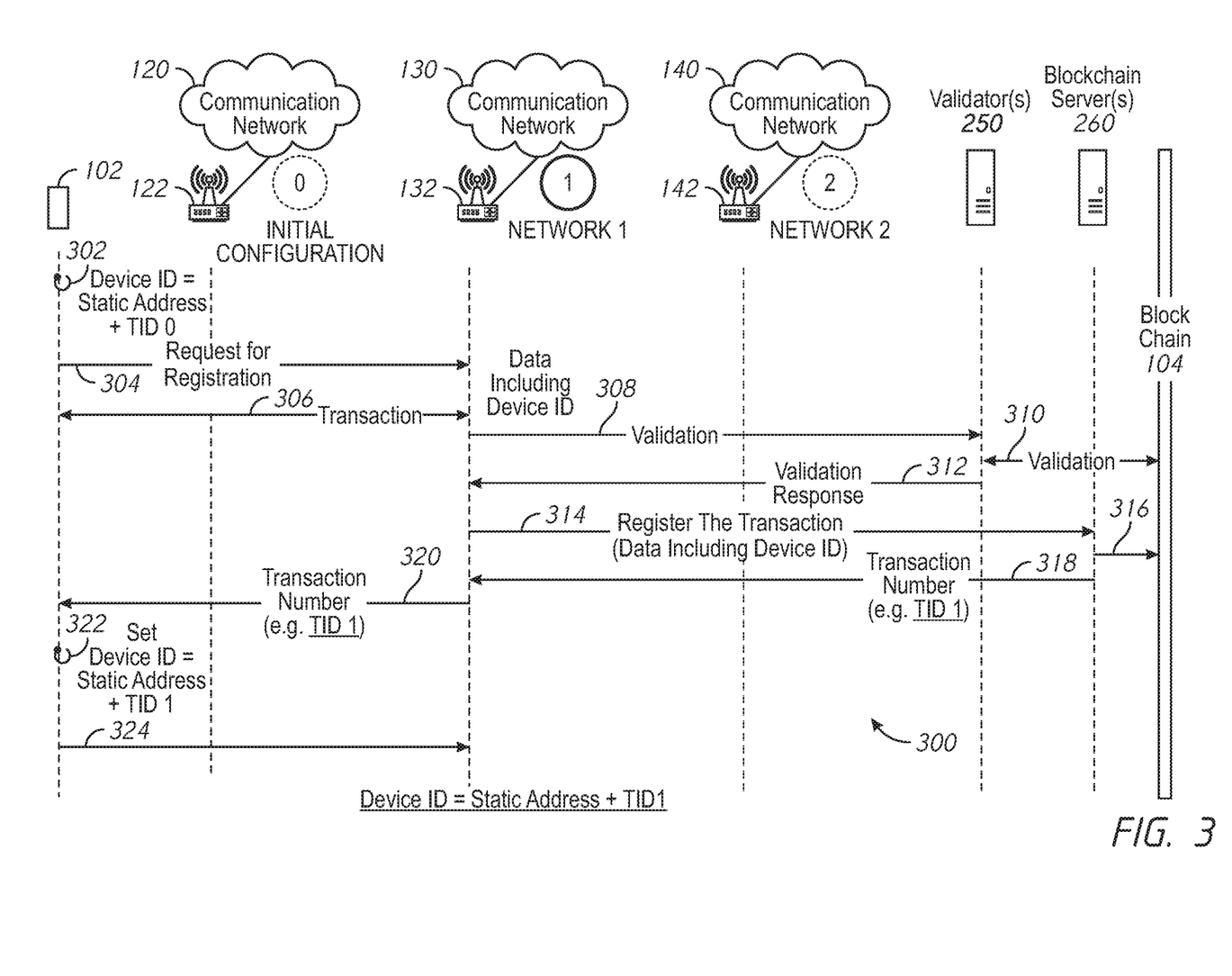
FIG. 3 is a message flow diagram for describing a method of updating or changing an identity of a device for communications in a communication network.

FIG. 3 is a message flow diagram 300 for describing a method of updating or changing an identity of a device for communications in a communication network. The device may be an Internet of Things (IoT) device, and/or be or include a sensor.

The method described in relation to the message flow diagram 300 of FIG. 3 may be performed after an initial configuration of device 102 (e.g. after the performance of the method of FIG. 2). The method of FIG. 3 may be viewed as the device's first registration with a network after its manufacture and/or initial configuration.

Communications of device 102 in relation to communication network 130 ("NETWORK 1") at the location "1" is now described in relation to FIG. 3. Here, device 102 may be set or configured with an identity which is derived from or includes a static address and a transaction number or ID of a previous transaction (step 302 of FIG. 3) (e.g. from performance of the method of FIG. 2). For example, Device ID="Static Address+TID 0" as illustrated in FIG. 3.

Device 102 is positioned within a coverage area of communication network 130. In particular, device 102 is positioned at location "1" within a coverage area of fog router 132 of communication network 130. In response, device 102 initiates a procedure for registering in communication network 130 (step 304 of FIG. 3). In a transaction of the procedure for registration, device 102 may communicate data associated with the device to fog router 132 (step 306 of FIG. 3). The data may include the identity for addressing communications to and from device 102 (e.g. Device ID="Static Address+TID 0"). The data associated with device 102 may be or include other data, such as a device type, a device location or geolocation, a device IP address, as some examples.

Fog router 132 may cause at least some of the data associated with device 102 (e.g. the identity of the device or a part of the identity) to be validated against blockchain 104 (step 308 of FIG. 3). Fog router 132 may itself validate the data against blockchain 104, or may cause the data to be validated by sending a request for validation to one or more validators 250 configured to perform validation against the blockchain 104 (step 310 of FIG. 3).

Fog router 132 receives a validation response from the validation (step 312 of FIG. 3). In response to a successful validation of the data, fog router 132 causes the transaction with device 102 to be registered in blockchain 104 (step 314 of FIG. 3). The registered transaction may include at least some of the received data, such as the identity of device 102 (e.g. Device ID="Static Address+TID 0"). In some implementations, fog router 132 generates and digitally signs the transaction with its private key and registers the signed transaction in the blockchain 104. Registration of the transaction into blockchain 104 may be performed through use of one or more blockchain servers 260 (step 210 of FIG. 2).

In response to registration of the transaction in blockchain 104, fog router 132 may receive a transaction number (e.g. "transaction ID 1" or "TID 1") associated with the transaction (step 318 of FIG. 3). Fog router 132 may send the transaction number (e.g. TID 1) to device 102 (step 320 of FIG. 3). Here, fog router 132 may send the transaction number in association with a request to update the identity of device 102. Device 102 may receive the request and/or transaction number (e.g. TID 1) associated with the transaction.

In response, device 102 may set or derive an updated identity based on the received transaction number (e.g. TID 0) associated with the transaction (step 322 of FIG. 3). In some implementations, device 102 may derive the updated identity from a static address of the device and the transaction number. In addition, or alternatively, device 102 may derive the updated identity by combining a static address of device 102 and the transaction number. In FIG. 3, the updated identity is represented as Device ID="Static Address+TID 1".

Device 102 may communicate or otherwise provide the newly-updated identity for normal operation and communications in communication network 120 (step 324 of FIG. 3). In some implementations, device 102 may communicate the updated identity to fog router 132 and/or communication network 130 for communicating with device 102. During communications in the network, device 102 may receive messages addressed to the updated identity, and send messages addressed from the updated identity.

Figure 4:
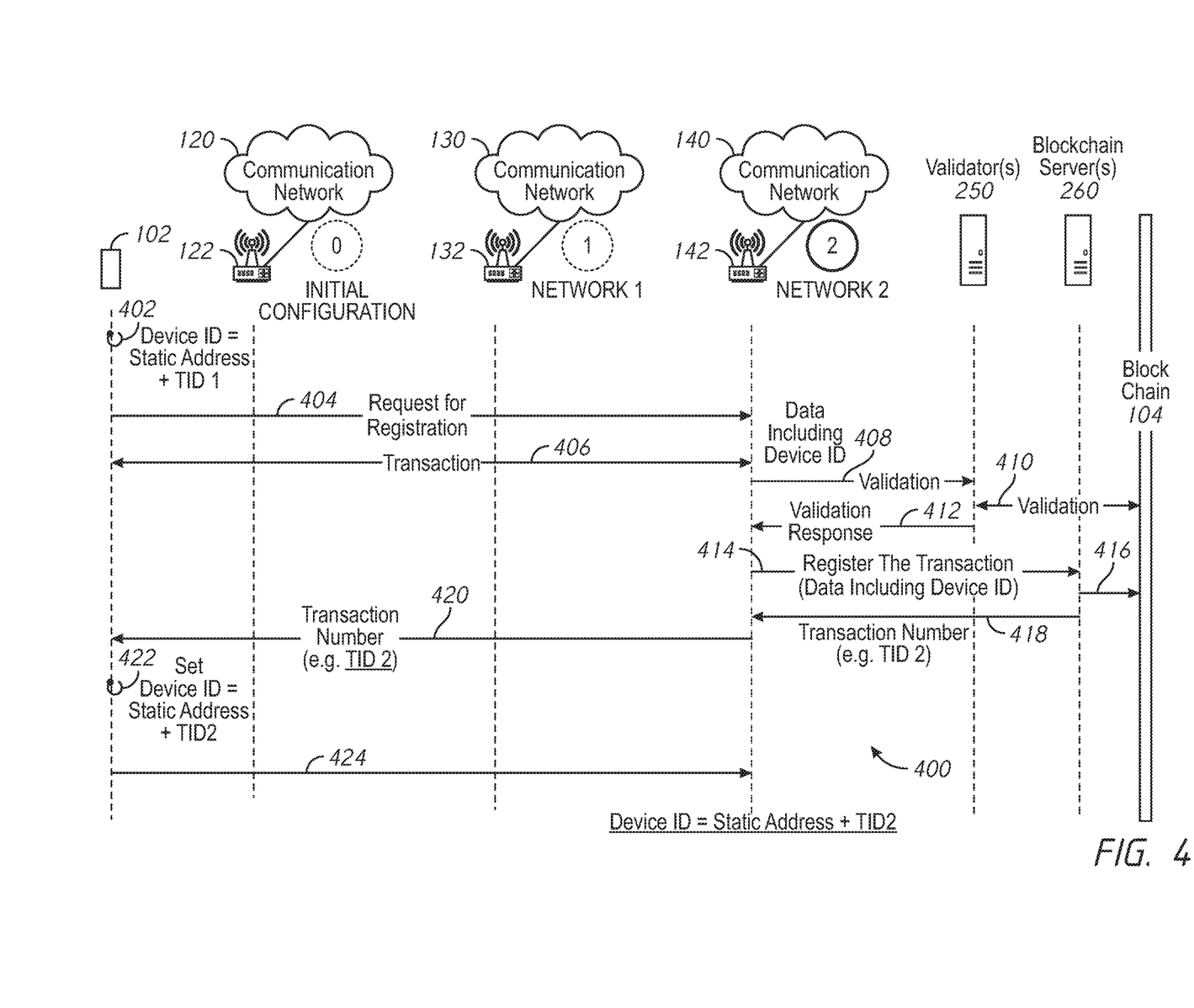
FIG. 4 is a message flow diagram for describing a method of updating or changing an identity of a device again for communications in a communication network.

FIG. 4 is a message flow diagram 400 for describing a method of updating or changing an identity of a device again for communications in a communication network. The device may be an Internet of Things (IoT) device, and/or be or include a sensor.

The method described in relation to the message flow diagram 400 of FIG. 4 may be performed after device's 102 registration and communications in communication network 130 ("NETWORK 1") (e.g. after the performance of the method of FIG. 3). The method of FIG. 4 may be viewed as the device's 102 second or a subsequent registration with a different communication network.

Communications of device 102 in relation to communication network 140 ("NETWORK 2") at the location "2" is now described in relation to FIG. 4. Initially, device 102 may be set or configured with an identity which is derived from or includes a static address and a transaction number or ID of a previous transaction (step 402 of FIG. 4) (e.g. from the performance of the method of FIG. 3). For example, Device ID="Static Address+TID 1" as illustrated in FIG. 4.

Device 102 is positioned within a coverage area of communication network 140. In particular, device 102 is positioned at location "2" within a coverage area of fog router 142 of communication network 140. In response, device 102 initiates a procedure for registering in communication network 140 (step 404 of FIG. 4). In a transaction of the procedure for registration, device 102 may communicate data associated with the device to fog router 142 (step 406 of FIG. 4). The data may include the identity for addressing communications to and from device 102 (e.g. Device ID="Static Address+TID 1"). The data associated with device 102 may be or include other data, such as a device type, a device location or geolocation, a device IP address, as some examples.

Fog router 142 may cause at least some of the data associated with device 102 (e.g. the identity of the device or a part of the identity) to be validated against blockchain 104 (step 408 of FIG. 4). Fog router 142 may itself validate the data against blockchain 104, or may cause the data to be validated by sending a request for validation to one or more validators 250 configured to perform validation against the blockchain 104 (step 410 of FIG. 4).

Fog router 142 receives a validation response from the validation (step 412 of FIG. 4). In response to a successful validation of the data, fog router 142 causes the transaction with device 102 to be registered in blockchain 104 (step 414 of FIG. 4). The registered transaction may include at least some of the received data, such as the identity of device 102 (e.g. Device ID="Static Address+TID 1"). In some implementations, fog router 142 generates and digitally signs the transaction with its private key and registers the signed transaction in the blockchain 104. Further, registration of the transaction into blockchain 104 may be performed through use of one or more blockchain servers 260 (step 416 of FIG. 4).

In response to registration of the transaction in blockchain 104, fog router 142 may receive a transaction number (e.g. "transaction ID 2" or "TID 2") associated with the transaction (step 418 of FIG. 4). Fog router 142 may send the transaction number (e.g. TID 2) to device 102 (step 420 of FIG. 4). Here, fog router 142 may send the transaction number in association with a request to update the identity of device 102. Device 102 may receive the transaction number (e.g. TID 2) associated with the transaction from the registration of the transaction in blockchain 104.

In response, device 102 may set or derive an updated identity based on the received transaction number (e.g. TID 2) associated with the transaction (step 422 of FIG. 4). In some implementations, device 102 may derive the updated identity from a static address of the device and the transaction number. In addition, or alternatively, device 102 may derive the updated identity by combining a static address of device 102 and the transaction number. In FIG. 4, the updated identity is represented as Device ID="Static Address+TID 2".

Device 102 may communicate or otherwise provide the updated identity for normal operation and communications in communication network 120 (step 424 of FIG. 4). In some implementations, device 102 may communicate the updated identity to fog router 142 and/or communication network 130 for communicating with device 102. During communications in the network, device 102 may receive messages addressed to the updated identity, and send messages addressed from the updated identity.

Figure 5:
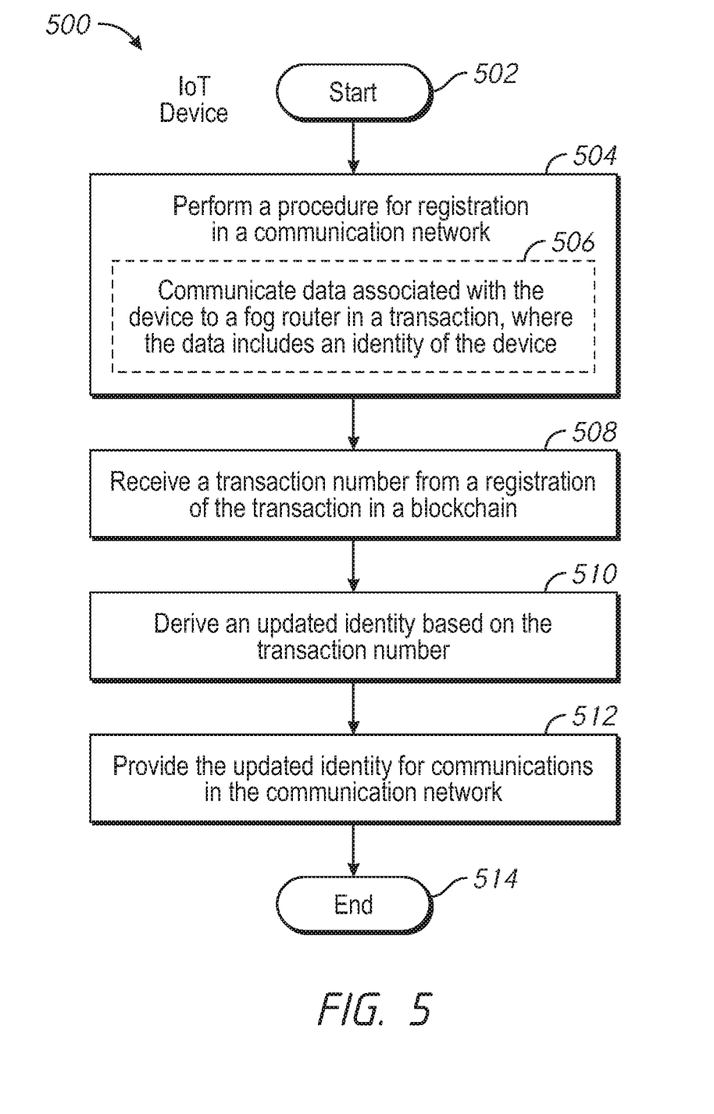
FIG. 5 is a flowchart for describing a method of updating or changing an identity of a device for communications in a communication network, which may be performed by the device.

FIG. 5 is a flowchart 500 for describing a method of updating or changing an identity of a device for communications in a communication network. The method may be performed by a device, such as an Internet of Things (IoT) device (which may be or include e.g. a sensor), in communication with a fog router of a communication network.

Beginning at a start block 502 of FIG. 5, a device is positioned within a coverage area of a communication network. In response, the device may initiate a procedure for registration in the communication network (step 504 of FIG. 5). In a transaction of the procedure, the device may communicate data associated with the device to a network device, such as a router or fog router (step 506 of FIG. 5). The data may include an identity for addressing communications to and from the device. The data associated with the device may be or include other data, such as a device type, a device location or geolocation, and a device IP address, as some examples.

At least some of the data associated with the device (e.g. the identity of the device or a part of the identity) may be validated against a blockchain. In response to a positive validation of the data, the transaction between the device and the fog router may be registered in the blockchain. The registered transaction may include at least some of the data (e.g. the identity of the device or a part of the identity).

The device may receive a transaction number associated with the transaction from the registration of the transaction in the blockchain (step 508 of FIG. 5). In some implementations, the fog router generates and signs the transaction with its private key, registers the signed transaction in the blockchain, receives the transaction number associated with the transaction in response, and sends the transaction number to the device.

The device may derive an updated identity based on the received transaction number associated with the transaction (step 510 of FIG. 5). In some implementations, the device may derive the updated identity from a static address (e.g. a MAC address) of the device and the transaction number. In addition, or alternatively, the device may derive the updated identity by combining a static address of the device and the transaction number.

The device may provide the updated identity for communications in the communication network (step 512 of FIG. 5). In some implementations, the device may communicate the updated identity to the fog router and/or communication network for communicating with the device. During communications in the network, the device may receive messages addressed to the updated identity, and send messages addressed from the updated identity.

Figure 6:
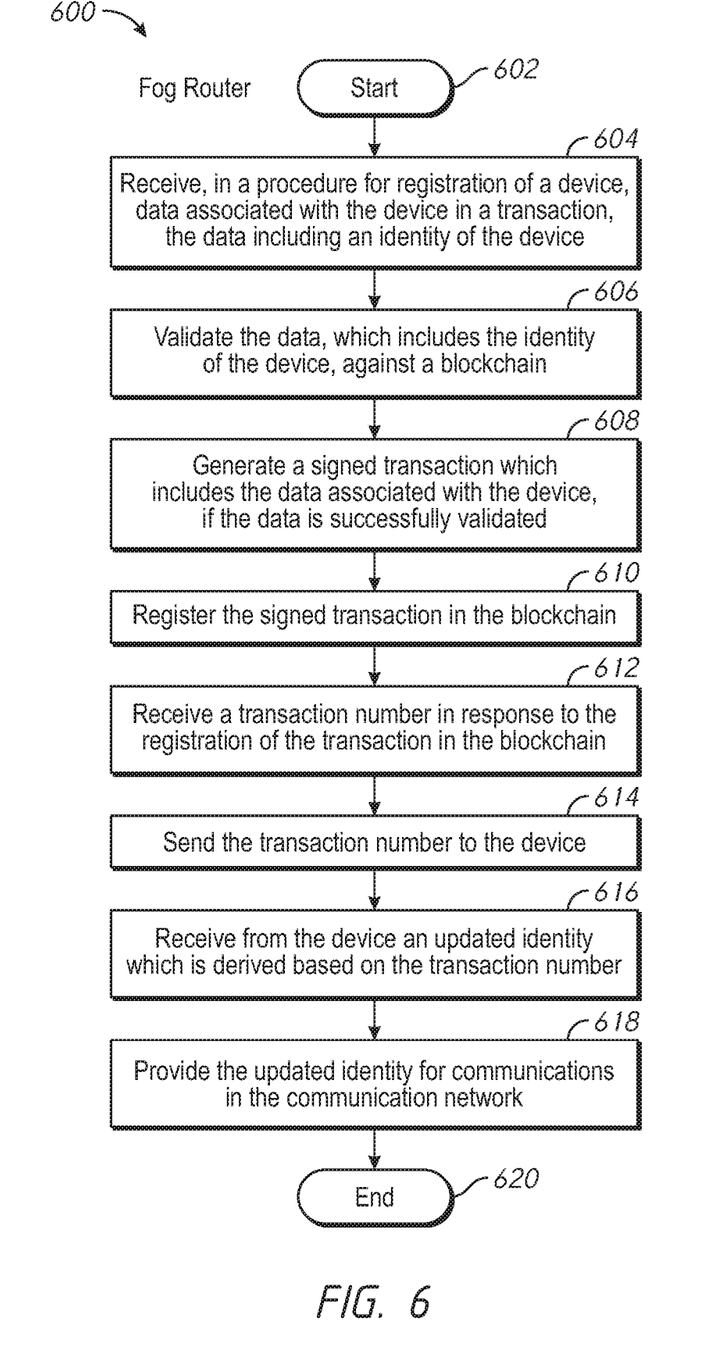
FIG. 6 is a flowchart for describing a method of updating or changing an identity of a device for communications in a communication network, which may be performed by a router (e.g. a fog router) or other network device of the communication network.

The flowchart 500 ends at an end block 514. The method may be repeated for each one of a plurality of registrations in a plurality of communication networks FIG. 6 is a flowchart 600 for describing a method for use in updating or changing an identity of a device for communications in a communication network. The method may be performed by a network device, such as a router (e.g. a fog router), of a communication network. The fog router may assist in updating or changing the identity of a device which is an Internet of Things (IoT) device. The IoT device may be or include a sensor.

In FIG. 6, a device is positioned within a coverage area of a communication network. In response, the device may initiate a procedure for registration in the communication network. In the procedure for registration, the device may communicate data associated with the device to a fog router of the communication network.

Beginning at a start block 602 of FIG. 6, the fog router may receive data associated with the device in a transaction with the device (step 604 of FIG. 6). The data associated with the device may be or include an identity for addressing communications to and from the device. The data associated with the device may be or include other data, such as a device type, a device location or geolocation, and a device IP address, as some examples.

The fog router may cause at least some of the data associated with the device (e.g. the identity of the device or a part of the identity) to be validated against a blockchain (step 606 of FIG. 6). The fog router may itself validate the data against the blockchain, or may cause the validation to be performed by sending a request for validation of the data to one or more validators configured to perform validation against the blockchain.

In response to a successful validation of the data, the fog router may generate a signed transaction which includes at least some of the data associated with the device (step 608 of FIG. 6). To digitally sign the transaction, the fog router may use a private key of the fog router. The fog router may register the signed transaction in the blockchain (step 610 of FIG. 6). The registered signed transaction may be or include at least some of the data associated with the device (e.g. the identity of the device or a part of the identity).

In response to the registration of the transaction in the blockchain, the fog router may receive a transaction number associated with the transaction (step 612 of FIG. 6). The fog router may send the transaction number to the device (step 614 of FIG. 6). Here, the fog router may send the transaction number in association with a request to update the identity of the device.

In response, the fog router may receive an updated identity from the device (step 616 of FIG. 6). The updated identity may be derived based on the transaction number associated with the transaction. In some implementations, the updated identity may be derived from a static address (e.g. a MAC address) of the device and the transaction number. In addition, or alternatively, the updated identity may be derived by combining the static address of the device and the transaction number.

The fog router may provide the updated identity of the device for communications in the communication network (step 618 of FIG. 6). In some implementations, the fog router may store in memory and/or communicate the updated identity to communication network. During communications in the network, the fog router may route messages addressed to the updated identity to the device, and route messages addressed from the updated identity to other devices.

The flowchart 600 ends at an end block 620. The method may be repeated for each one of a plurality of registrations of the device and/or other similarly-enabled devices. The method may be employed in each one of a plurality of fog routers in a plurality of communication networks.

Figure 7:
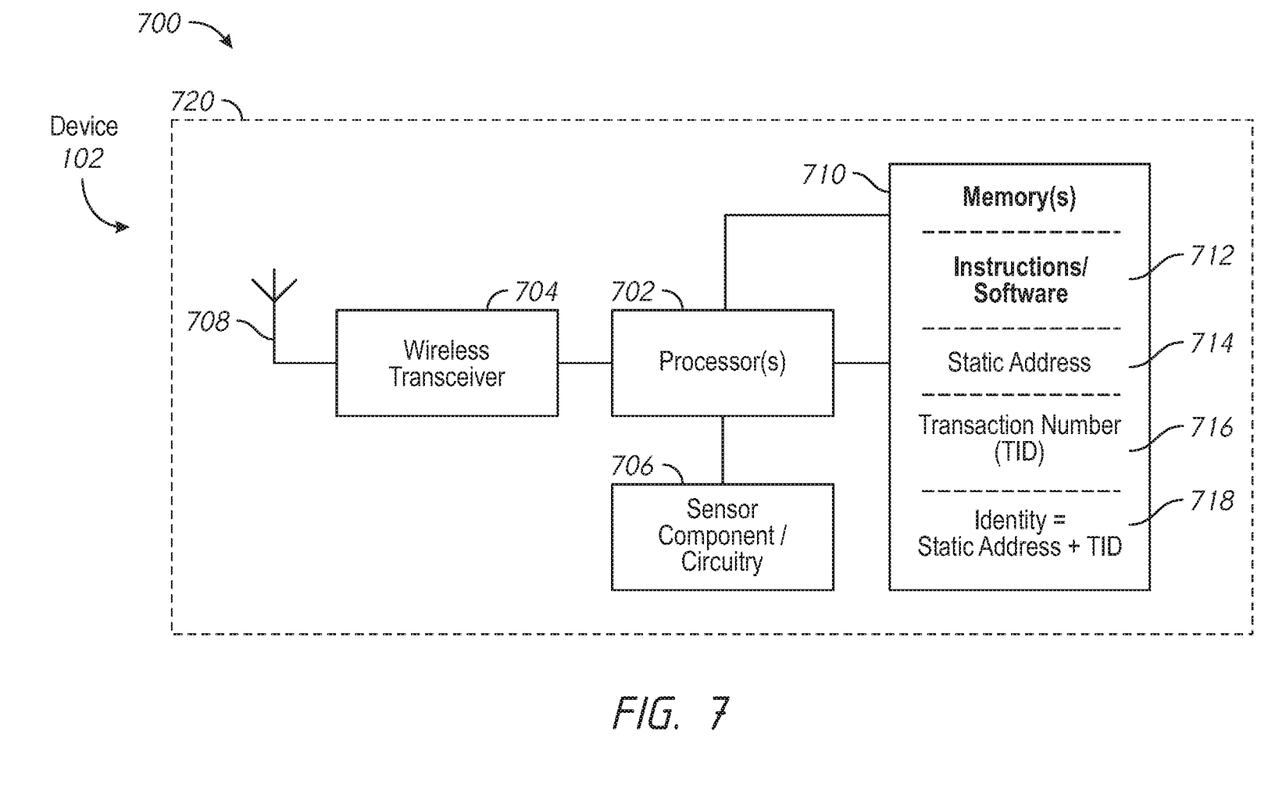
FIG. 7 is a schematic block diagram of a device, such as an Internet of Things (IoT) device.

FIG. 7 is a schematic block diagram 700 of an embodiment of a device (e.g. device 102 of FIGS. 1-5), which may be an Internet of Things (IoT) device. The IoT device may be or include, for example, a sensor or sensor device.

In FIG. 7, device 102 is shown to have components which may include one or more processors 702, a wireless transceiver 704, an antenna 708, and a memory 710. The components of device 102 may be provided together as a single unit and, for example, contained in a mechanical housing 720.

The one or more processors 702 may be coupled to wireless transceiver 704 and to memory 710. Memory 710 may store instructions/software 712 for operation. The one or more processors 702 are configured to operate according to the instructions 712 in order to perform processes for conventional operation of device 102, as well to perform techniques of the present disclosure. Relatedly, a computer program product may include a non-transitory computer-readable medium (e.g. memory, a computer disk, etc.) and computer instructions stored in the non-transitory computer-readable medium that, when executed by one or more processors, may perform the described techniques.

Wireless transceiver 704 is coupled to antenna 708 for wireless communications. One or more processors 702 are configured to operate wireless transceiver 704 to provide wireless communications in accordance with a communication protocol or standard. The communication protocol or standard adhered to by wireless transceiver 704 and/or one or more processors 702 may be IEEE 802.15, for communications in wireless personal area networks (WPANs) or the like. The one or more processors 702 may communicate signals to and/or from a sensor component/circuitry 706 for appropriate processing.

Memory 710 may store an identity 718 for addressing communications to and from device 102. The identity 718 of device 102 may be derived from or include a static address 714, such as a MAC address or similar type of hardware address or network address. In addition, or alternatively, the identity 718 of device 102 may be derived from or include a transaction number or ID (TID) 716. In some implementations, identity 718 is derived from and/or includes both static address 714 and a (dynamically-changing) transaction number or ID (e.g. TID) 716. More particularly, identity 718 may be a combination or appendage of static address 714 and transaction number 716. Identity 718 and/or transaction number 716 may be stored in Non-Volatile Random Access Memory (NVRAM).

What has been described herein are techniques for use in generating a dynamically-changing device identity with robust blockchain validation. In one illustrative example, a device (e.g. an IoT device) performs a procedure for registration when entering a communication network. The procedure includes communicating, in a transaction, data associated with the device to a network device, such as a fog router. The data includes, amongst other data items, an identity for addressing communications to and from the device. A transaction number associated with the transaction is received based on a blockchain registration of the transaction. An updated identity of the device is then derived based on the transaction number. For example, the updated identity of the device may be derived by combining a static address of the device and the transaction number. The steps may be repeated by the device for each one of a plurality of network registrations.

In another illustrative example, data associated with a device (e.g. an IoT device) are received at a network device, such as a fog router, in a transaction for registering the device in a communication network. The data include an identity for addressing communications to and from the device. At least some of the data are validated against a blockchain. In response to a successful validation of data, the transaction which includes the identity of the device is registered in the blockchain. An updated identity of the device is then received for communications, where the updated identity is derived based on a transaction number received in association with the trans action.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method, comprising:
   at a device,
      performing a procedure for registration in a communication network;
      in the procedure, communicating, in a transaction with a network device of the communication network, data associated with the device to the network device, the data including an identity for addressing communications to and from the device within the communication network;
      determining that the identity of the device is successfully validated in a blockchain, wherein the transaction between the device and the network device is registered in the blockchain as a signed transaction using a private key of the network device;
      receiving, based on the determining that the identity of the device is successfully validated in the blockchain, a transaction number associated with the transaction from the network device, wherein the transaction number is generated in response to registration of the transaction in the blockchain and indicative of the identity for addressing communications; and
      deriving, based on the determining that the identity of the device is successfully validated in the blockchain, an updated identity of the device using a combination of a) a static address of the device and b) the transaction number associated with the transaction, wherein the static address is hardware-based or network-based.

2. The method of claim 1, wherein the identity is derived from the static address of the device and a previous transaction number of a previous transaction involving the device.

3. The method of claim 1, further comprising:
   at the device,
      receiving, in the communication network, a message addressed to the updated identity; and
      sending, in the communication network, a message addressed from the updated identity.

4. The method of claim 1, wherein the device comprises an Internet of Things (IoT) device, and wherein communicating the data associated with the device further comprises communicating data which includes one or more of a type of the device, a location or geolocation of the device, and an IP address of the device.

5. The method of claim 1, wherein the communication network comprises a first communication network, the network device comprises a first network device, the transaction comprises a first transaction, and the transaction number comprises a first transaction number generated in response to a first registration of the first transaction in the blockchain, the method further comprising:
   at the device,
      performing a procedure for registration in a second communication network;
      in the procedure, communicating, in a second transaction with a second network device of the second communication network, data associated with the device to the second network device, the data including the updated identity for addressing communications to and from the device within the second communication network;
      receiving a second transaction number associated with the second transaction from the second network device, wherein the second transaction number is generated in response to a second registration of the second transaction in the blockchain and is indicative of the updated identify for addressing communications; and
      deriving a further updated identity using the second transaction number associated with the second transaction.

6. The method of claim 1, wherein the updated identity is for addressing communications to and from the device, the method further comprising:
   for each one of a plurality of registrations in a plurality of communication networks, repeating the steps of performing, receiving, and deriving.

7. A device, comprising:
   one or more processors;
   a wireless transceiver coupled to the one or more processors and in communication with one or more antennas, the wireless transceiver controlling the one or more antennas for performing wireless communications;
   the one or more processors being configured to:
      perform a procedure for registration in a communication network;
      in the procedure, communicate, in a transaction with a network device of the communication network, data associated with the device to the network device, the data including an identity for addressing communications to and from the device within the communication network;
      determine that the identity of the device is successfully validated in a blockchain, wherein the transaction between the device and the network device is registered in the blockchain as a signed transaction using a private key of the network device;
      receive, based on the determination that the identity of the device is successfully validated in the blockchain, a transaction number associated with the transaction from the network device, wherein the transaction number is generated in response to a registration of the transaction in a blockchain and indicative of the identity for addressing communications; and
      derive, based on the determination that the identity of the device is successfully validated in the blockchain, an updated identity of the device using a combination of a) a static address of the device and b) the transaction number associated with the transaction, wherein the static address is hardware-based or network-based.

8. The device of claim 7, wherein the network device comprises a fog router, and wherein the device comprises an Internet of Things (IoT) device.

9. The device of claim 7, further comprising:
wherein the device comprises an Internet of Things (IoT) device;
wherein the network device comprises a fog router;
wherein the one or more processors are further configured to communicate the data associated with the device by communicating data which includes one or more of a type of the device, a location or geolocation of the device, and an IP address of the device;
wherein the transaction between the device and the fog router is registered in the blockchain as a signed transaction using a private key of the fog router;
wherein the one or more processors are further configured to derive the updated identity by combining the static address of the device and the transaction number; and
wherein the one or more processors are further configured to repeat the steps of performing, receiving, and deriving for each one of a plurality of registrations in a plurality of communication networks.

10. A method comprising:
at a network device of a communication network,
receiving, in a transaction for a procedure for registration of a device, data associated with the device from the device, the data including an identity for addressing communications to and from the device within the communication network;
causing the data to be validated against a blockchain;
determining that the data is successfully validated in the blockchain;
registering the transaction which includes the identity of the device in the blockchain as a signed transaction using a private key of the network device;
receiving a transaction number associated with the transaction that is generated in response to registration of the transaction in the blockchain and indicative of the identity for addressing communications;
sending, based on the determining that the data is successfully validated in the blockchain, the transaction number to the device; and
receiving an updated identity of the device from the device, the updated identity being derived using a combination of a) a static address of the device and b) the transaction number associated with the transaction, wherein the static address is hardware-based or network-based.

11. The method of claim 10, further comprising:
digitally signing the transaction using the private key of the network device.

12. The method of claim 10, further comprising:
sending to the device a request to update the blockchain with the transaction.

13. The method of claim 10, wherein the network device comprises a fog router, and the device comprises an Internet of Things (IoT) device.

14. The method of claim 10, wherein the updated identity is derived from the static address of the device and a previous transaction number of a previous transaction involving the device.

15. The method of claim 10, wherein the device comprises an Internet of Things (IoT) device, and wherein communicating the data associated with the device further comprises communicating data which includes one or more of a type of the device, a location or geolocation of the device, and an IP address of the device.

* * * * *